United States Patent
MacDonald et al.

(10) Patent No.: US 7,418,675 B2
(45) Date of Patent: Aug. 26, 2008

(54) SYSTEM AND METHOD FOR REDUCING THE POWER CONSUMPTION OF CLOCK SYSTEMS

(75) Inventors: Colin MacDonald, Austin, TX (US); John M. Dalbey, Austin, TX (US); Anis M. Jarrar, Austin, TX (US)

(73) Assignee: Freescale Semiconductor, Inc., Austin, TX (US)

( * ) Notice: Subject to any disclaimer, the term of this patent is extended or adjusted under 35 U.S.C. 154(b) by 119 days.

(21) Appl. No.: 11/342,747

(22) Filed: Jan. 30, 2006

(65) Prior Publication Data

US 2007/0180410 A1 Aug. 2, 2007

(51) Int. Cl.
*G06F 17/50* (2006.01)

(52) U.S. Cl. .............................. 716/2; 716/18
(58) Field of Classification Search ............... 716/1, 716/2, 17, 18
See application file for complete search history.

(56) References Cited

U.S. PATENT DOCUMENTS

| 5,657,239 | A | * | 8/1997 | Grodstein et al. ............... 716/6 |
| 6,204,713 | B1 | | 3/2001 | Adams |
| 6,473,890 | B1 | * | 10/2002 | Yasui et al. ..................... 716/10 |
| 7,095,251 | B2 | * | 8/2006 | Wilcox et al. .................. 326/93 |
| 2004/0150427 | A1 | | 8/2004 | Wilcox |
| 2007/0030030 | A1 | * | 2/2007 | Waldrop ....................... 326/93 |

* cited by examiner

*Primary Examiner*—Jack Chiang
*Assistant Examiner*—Binh C Tat

(57) ABSTRACT

A system an method of designing an integrated circuit identifies a plurality of synchronous cells of an integrated circuit to be driven by a clock driver, wherein the plurality of synchronous cells are a subset of previously placed cells of the integrated circuit. The placement of synchronous cells is performed to reduce a current needed from the clock driver to drive the plurality of synchronous cells.

13 Claims, 4 Drawing Sheets

SYSTEM AND METHOD FOR REDUCING THE POWER CONSUMPTION OF CLOCK SYSTEMS

FIELD OF THE DISCLOSURE

The present disclosure is related generally to computer aided design tools and more particularly to systems and methods for configuring clock systems.

BACKGROUND

Portable electronic devices such as radiotelephones continue to grow in popularity. Makers of such devices continue to improve the speed, functionality and battery life of these devices utilizing computer aided design tools such as Physical Compiler from Synopsys or First Encounter by Cadence Inc. These tools can operate on mainframes that utilize workstations or on personal computers possibly internetworking with other computers.

Many portable electronic products or devices have functional systems on a single microchip or integrated circuit (IC). This configuration is often referred to as a "system on a chip" (SoC). A SoC can have a clock tree or clock system that provides clock signals to design elements, referred to herein as "cells," that are selected from a cell library. The clock tree provides clock signals throughout the IC such that multiple circuits on the IC can be time synchronized. Such clock trees can become large and consume a significant portion of the total power required to operate the IC due in part to poor clock system design. Typically, the clock system is one of the last circuits configured or "placed" during the design process. This occurs because until all synchronous cells are in place, the designer or CAD (computer aided design) tool does not know where to place clock drivers. As a result, clock tree components are often patched into the design late in the design process utilizing left over space. Such a design progression requires some branches or conductors within the clock tree to be relatively long, and synchronous cells that terminate the conductors are often located in less than desirable locations with less than desirable interconnect configurations relative the clock tree. Accordingly, there is a need for systems and methods to improve clock systems in integrated circuits.

BRIEF DESCRIPTION OF THE DRAWINGS

The present disclosure may be better understood, and its numerous features and advantages made apparent to those skilled in the art by referencing the accompanying drawings.

DETAILED DESCRIPTION OF THE DRAWINGS

In accordance with one aspect of the present disclosure, systems and methods are disclosed that can position components in a clock system to reduce signal routing requirements including the number of components and the length of conductors in the system. Such a method can result in a device that consumes less power, operates at faster clock speeds and is less expensive to manufacture.

In accordance with the present disclosure components or circuits within an integrated circuit (IC) that have the same or similar clock input requirements in a general area can be identified. In one embodiment a clock driver cell that drives synchronous cells can be identified. The clock driver cell's current location can be approved and utilized or the clock driver cell can be relocated to a more suitable location and approved for that location. Next synchronous cells connected to the output of the driver cell can be identified using a design layout program used to identify synchronous cells connected to the driver cell for relocation to reduce an amount of current, and therefore power, needed to drive the synchronous cells. Thus, the driver cell can be repositioned in closer proximity to an area having significant clock signal requirements and the synchronous cells can be positioned proximate to the final drive cell in an effort to reduce the amount of current needed to drive the synchronous cells. Once new locations for placement of the synchronous cells are determined, the synchronous cells can be oriented, i.e., rotated, such that a clock input node of the synchronous cell is positioned to reduce an interconnect length of a conductor of the clock tree. As used herein, it will be appreciated the synchronous cells are cells that can retain a logic state and are responsive to a transitioning signal, such as a rising edge of a signal or a falling edge of the signal.

In the event that a compatible cell with different clock pin orientation would allow for a shorter clock signal path, such a cell with a more suitable clock pin positioning can be utilized to replace the existing cell. Thus, in one embodiment the synchronous cells are selectively integrated into space proximate to the approved location of the driver cell.

In another embodiment, cells performing functions other than clock type functions can be assigned a priority and considered relocatable cells such that non-clock cells can be relocated to make room for synchronous cells to allow for a more efficient clock tree.

After the synchronous cells are oriented or re-oriented, the conductors for the clock trees can be routed. Once routing has been performed, the new circuit(s) can be further evaluated to determine if timing constraints are met. Examples of timing constraints include setup times, hold time, clock skew and latency requirements. If the timing is undesirable, targeted measures can be employed to address such problems as required to create a robust clock tree design.

Figure 1:
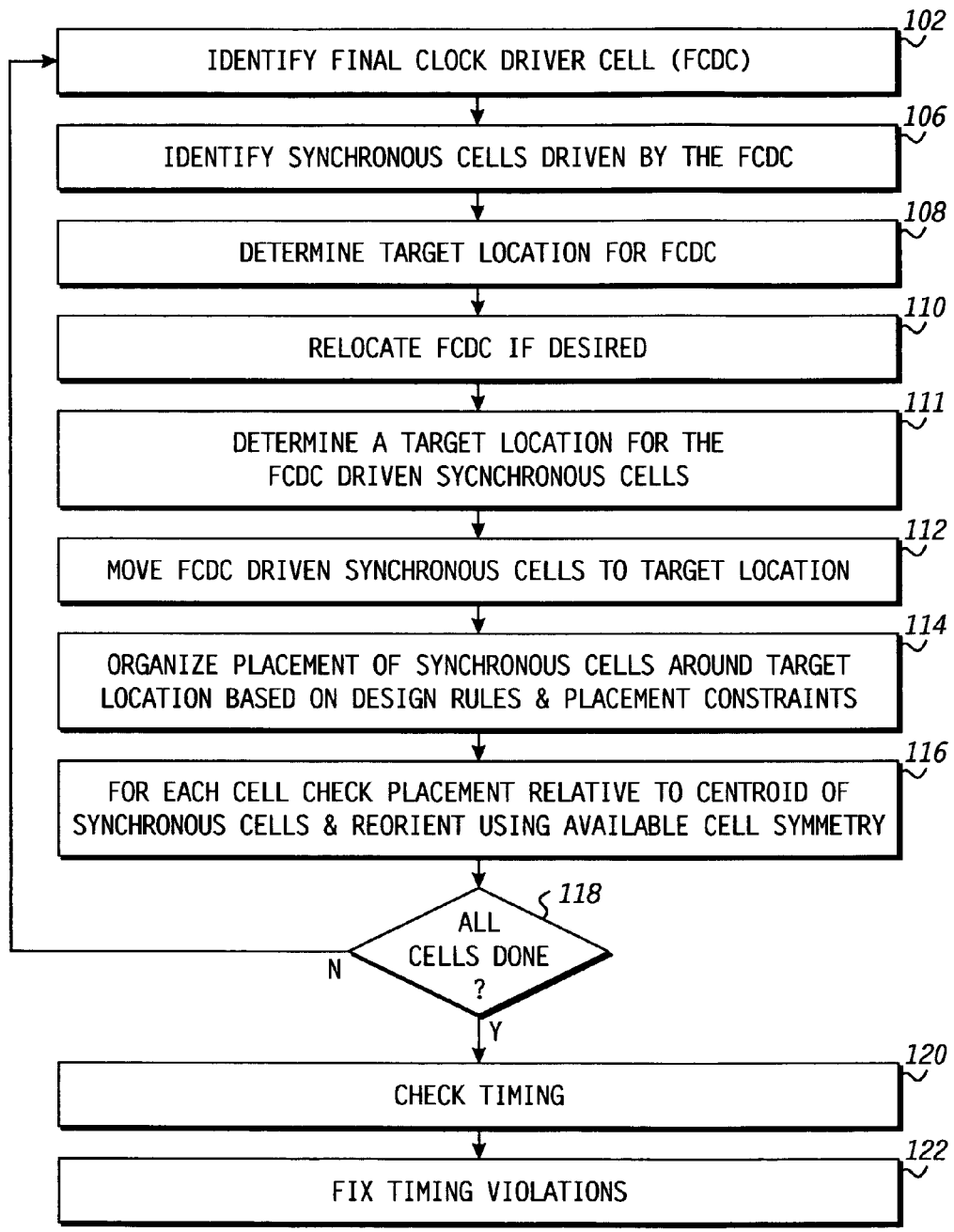
FIG. 1 is a flow diagram illustrating an exemplary method for configuring a clock system in accordance with one embodiment of the present disclosure.

Referring to FIG. 1, an exemplary method for configuring a clock system is disclosed. At 102 an output to be connected to a plurality of synchronized cells is identified and a corresponding final drive cell in a system layout of an integrated circuit having a plurality of electronic cells is identified for analysis. A final drive cell is an electronic device that drives a plurality of synchronous electronic devices. For example, final drive cells 212, 214, 216, 218, and 220 of FIG. 2. As illustrated at 106, synchronous cells that are driven by the identified final drive cell are identified. Depending on the type of technology utilized, a typical final drive cell may be able to drive up to 20 synchronous cells, at which point the capacitive loading presented by the conductors and the load can adversely affect the attributes of the clock signal provided by the final drive cell.

Thus, in accordance with the present disclosure, when the length of conductors in one or more final stages of the clock tree can be reduced, there is a possibility that the total number of final drive cells needed in the clock tree can also be reduced since the capacitance needing to be driven has been reduced. Reducing conductor lengths between the outputs of the final stage clock drivers and the inputs of their respective synchronous cells can greatly reduce the power consumption of the final stage of clock tree within an integrated circuit. Reducing the number of final drive cells can reduce the number of clock tree (up-stream clock stages) drivers in previous stages of the clock tree and thus further reducing the power consumption and area needed by the clock tree with the integrated circuit.

Figure 3:
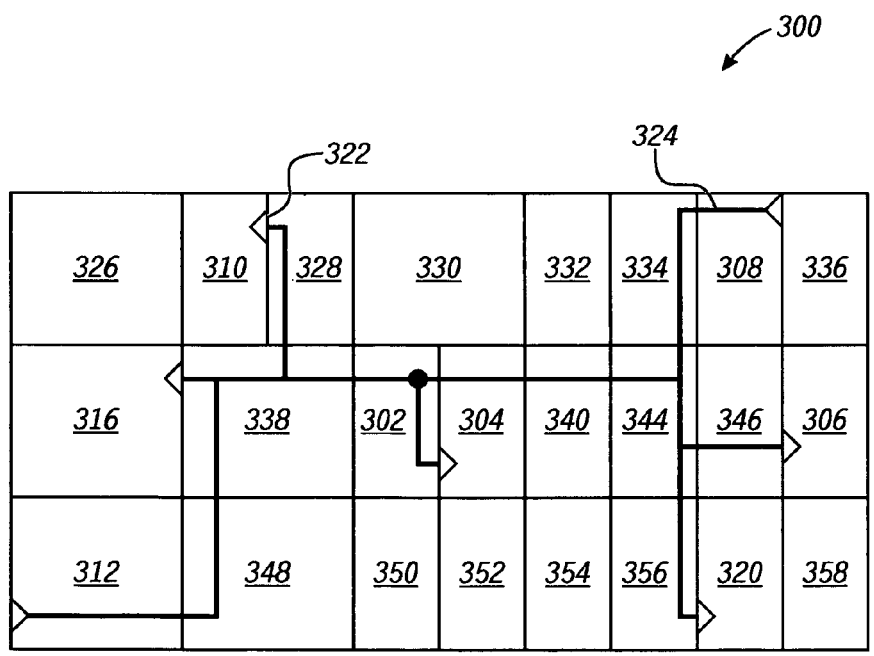
FIG. 3 is a block diagram illustrating an exemplary unimproved integrated circuit layout having clock drivers.
Figure 5:
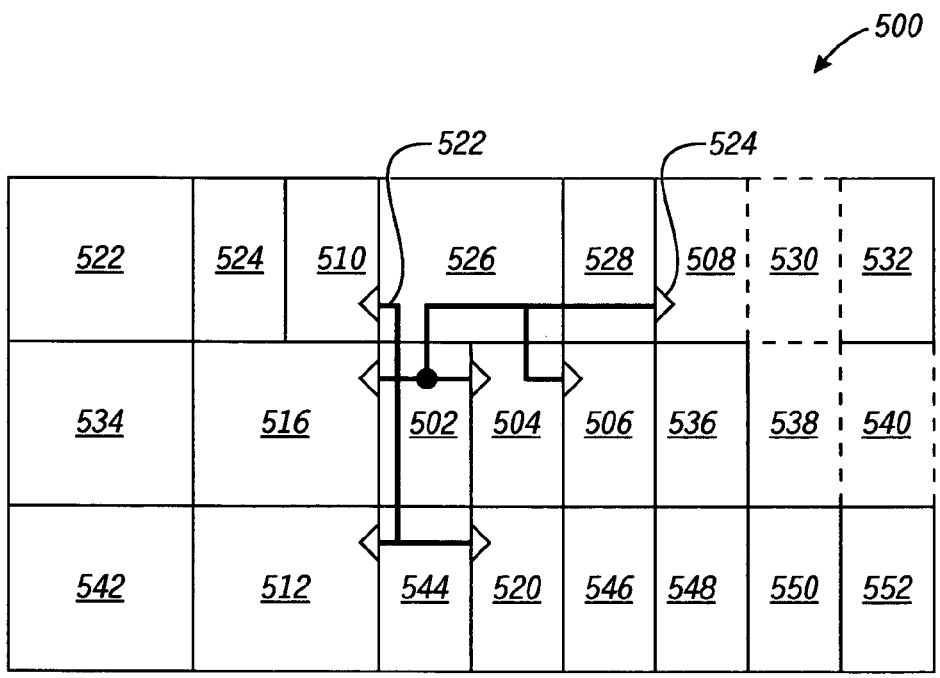
FIG. 5 is a block diagram illustrating an improved exemplary layout of clock drivers and synchronous cells in accordance with the present disclosure.

Referring briefly to FIG. 3, a portion of a typical clock tree layout that has a single final drive cell 302 and multiple synchronous cells 304, 306, 308, 310, 312, and 320 (304-320) are illustrated to assist the reader in understanding the subject disclosure. The layout of FIG. 3 illustrates the final drive cell 302 to supplying a clock signal to cells that are relatively far away, wherein FIG. 5 illustrates an improved configuration having a reduction in clock tree conductor lengths between the comparable drive cell 502 and cells 504, 506, 508, 510, 512, and 520 (cells 504-520). An additional discussion will be provided below with respect to both FIG. 3 and FIG. 5.

Referring back to FIG. 1, a target area for re-locating the final drive cell can be determined as illustrated at 108. In one embodiment, synchronous cells connected to the identified final drive cell are identified, and a centroid of the synchronous cells or clock requirements is determined. The centroid can be utilized to define a target area to initially place synchronous cells to be relocated. The target location can also be determined based on many other parameters such as unused (unoccupied) space available for conductors and cells, the relocatability of non-clock cells or components in the surrounding area and a fixed location relative the final drive cell, to name a few. Generally, a target location can be determined that will provide starting point for determining a beneficial concentration of clock tree components.

The identified final drive cell can be relocated to the targeted location as illustrated by block 110 or if a final drive cell is in an acceptable location and if it would be advantageous to not disturb the position of the final drive cell, the original location can be approved. As illustrated at 111 and 112, the identified synchronous cells can be moved in close proximity to the located or relocated drive cell such that a convergence of clock system components can occur. In one embodiment, the identified synchronous cells can be moved automatically by an optimization program to a location determined at 111, such as to a centroid of the synchronous cells. In one embodiment, a computer aided design tool can select and move the synchronous cells close to, or on top of the final drive cell. Some design tools have a graphical user interface, wherein a user can select and drag and drop the synchronous cells, moving them to another location. In a particular embodiment, the synchronous cells can be placed at random locations proximate to a final drive cell. In one embodiment, these locations result in one or more design rule violations or placement constraint violations. The design tool or system typically cannot integrate the dropped or displaced synchronous cell at these random locations but with some movement and orientation the synchronous cell can be incorporated or integrated in the design layout near or proximate to the final drive cell in available space as indicated at 114 based design rules or placement constraints of a placement module.

Note that the term "legalized: or "legalizing" as used herein with respect to a cell is defined to mean the automated processes of placing a cell having a current location that violates a placement constraint at a new location that does not violate the placement constraint. An example of a program that legalizes cells is Encounter from Cadence, Inc.

Figure 4:
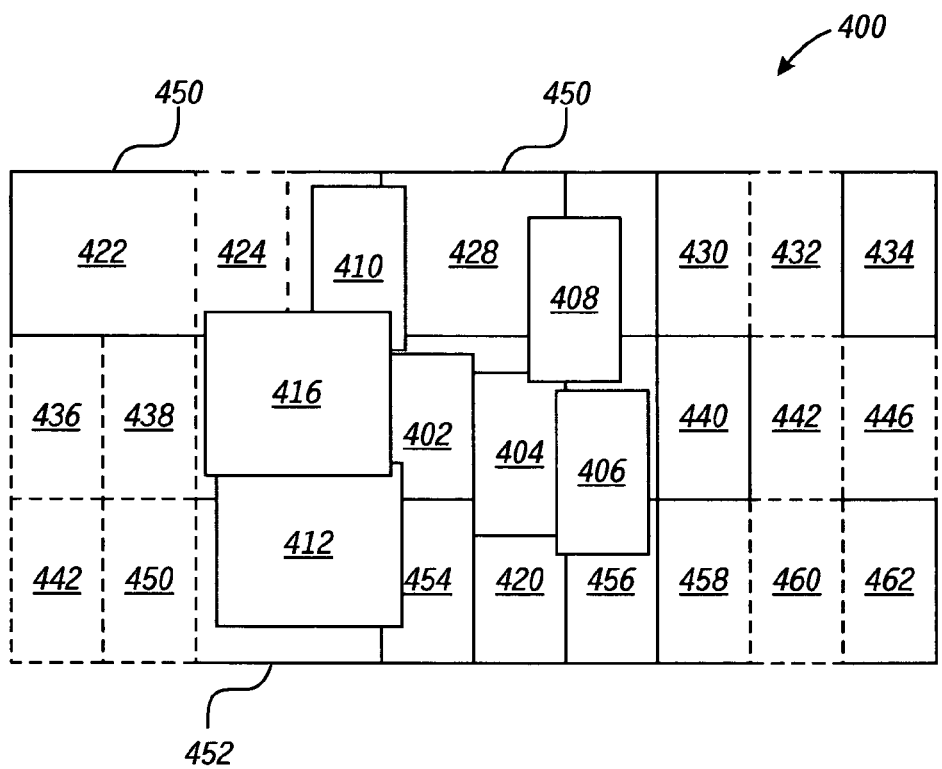
FIG. 4 is a block diagram illustrating an exemplary temporary layout of clock drivers in accordance with the present disclosure.

Some computer aided design tools will allow the synchronous cells to be moved and placed such that the synchronous cell physically overlaps the final drive cell. Referring to FIG. 4 an illustrative example of such a configuration wherein synchronous cells have been "re-located at random" proximate to the final drive cell. The design tool can correctly legalize the displaced synchronous cells according to placement constraints.

The constraints that need to be met for a synchronous cell to be legalized can be either "hard" or "soft" constraints. A hard constraint has a higher level of priority within the computer aided design (CAD) tool and will be met, if feasible. A soft constraint has a lower level of priority within the CAD tool and can be traded-off against or compared to the importance or priority of other design requirements. Design rules represent constraints having a higher priority level than constraints that should be satisfied for the design to be considered manufacturable and ultimately operable. For example, one constraint can include a maximum number of synchronous cells that can be coupled to a final drive cell.

Cells can be considered building blocks supporting different functions that are assembled based on design requirements to create an integrated circuit. Some cells may have the same function but a different symmetry (physical outline) or pin-out, (i.e. same physical outline but different pin locations within the cell's outline). Libraries of cells, which are used in the design of SoCs, commonly contain multiple versions of cells with different symmetries. During the design process, a cell with a first symmetry can be swapped with a compatible cell of a different symmetry to gain an advantage in the routing of a circuit due to pin locations. Similarly, a cell can be oriented (i.e., rotated) to move the location of its input/output pins.

As illustrated at 116, a cell's orientation can be changed if it will result in reducing the current drive requirement of the driver to which it is connected.

In one embodiment, if a synchronous cell has a higher priority than a non-clock type cell that is already placed, the cell with the lower priority can be moved to a new location and its position identified as available space to be utilized for placement of a synchronous cell or even a final drive cell.

In one embodiment, a designer or an automated design tool can identify and mark sensitive areas of the clock tree that have critical placement, routing or timing requirements and exempt such an area from being subject to the analysis and reconfiguration. (Note that the method of FIG. 1 can be performed on a design that has been placed, routed and has its timing previously verified.

At 118 flow proceeds to 102 if it is determined there are additional cells to be processed. If not, flow proceeds to 120 where timing of the design is checked, followed by any additional design changes to correct timing as necessary at 122.

The method illustrated in FIG. 1 can be implemented utilizing software modules or computer readable code that causes a processor of a computer system to perform such a function. One such module may be a design analyzer or rules enforcer that utilizes a hierarchy of rules to determine that a clock tree design satisfies many different parameters or a minimum set of parameters. If a finished design passes such a monitoring process then it is likely that the clock tree will provide acceptable operation when manufactured.

Figure 2:
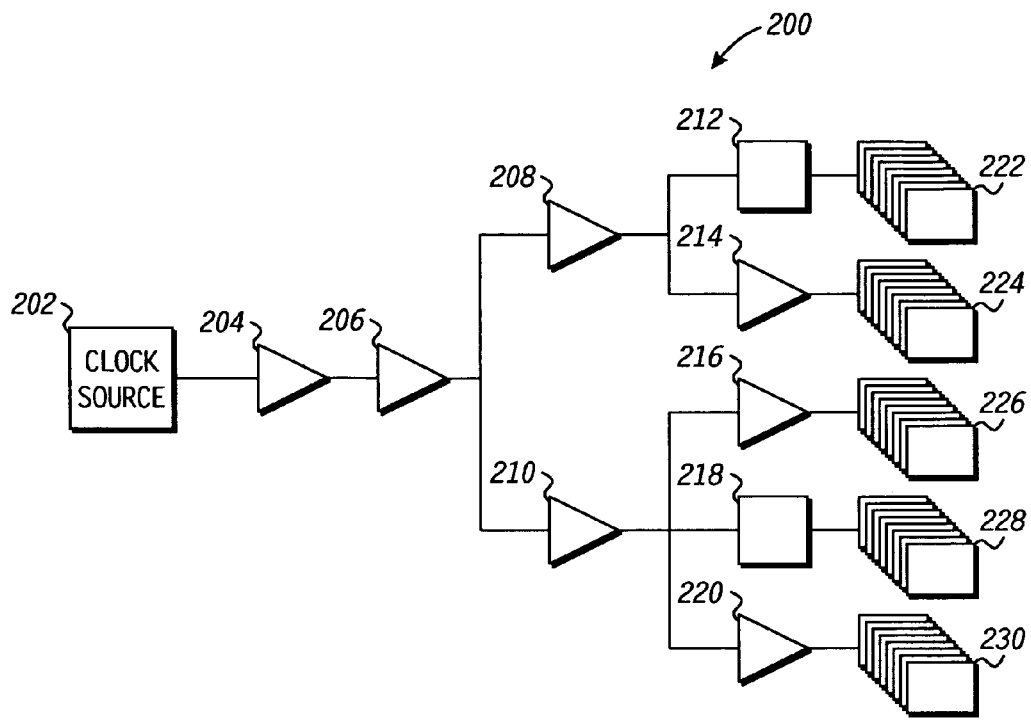
FIG. 2 is a block diagram that illustrates a basic structure of a clock tree in accordance with another embodiment of the of the present disclosure.

Referring to FIG. 2, an exemplary illustration of a clock tree 200 is provided in a conceptual format. The clock tree 200 can have an oscillator or clock source 202 that is connected to initial drivers 204 and 206 that drive secondary drivers 208 and 210 that in turn drive final drive cells 212-220. The final drive cells can function as buffers (inverting or non-inverting) as represented by drive cells 214, 216, and 220, or function as logic elements, as represented by drive cells 212 and 218, which receive additional control signals (not illustrated). Each of the final drive cells 212-220 can drive synchronous cells. For example, final drive cell 212 is driving a plurality of synchronous cells illustrated by 222, final drive cell 214 is driving synchronous cells illustrated by 224, final drive cell 216 is driving synchronous cells illustrated by 226, final drive cell 218 is driving synchronous cells illustrated by 228, and final drive cell 220 is driving a plurality of synchronous cells illustrated by 230. Thousands of synchronous cells may exist in a system design and the illustration provided by FIG. 2 is only a portion of a typical clock system FIG. 3 illustrates a portion 300 of an integrated circuit including electronic cells 326, 310, 328, 330, 332, 334, 308, 336, 316, 338, 302, 304, 340, 340, 344, 346, 306, 312, 348, 350, 352, 354, 356, 320, and 358. Portion 300 also a clock tree layout 324 having a final drive cell 302 connected to multiple synchronous cells is disclosed, subsequent to a normal place and route process. Final drive cell 302 can receive a clock signal from a source (not shown) and provide a robust clock signal to synchronous cells connected to its output illustrated by a black dot, where the conductors are connected to the final drive cell 302. The region surrounding final drive cell 302 may contain cells with a fixed placement requirement that cannot be relocated. The region may also contain cells with no fixed placement requirement that can be moved. Finally, the region may contain empty cell sites that can be occupied by suitably sized cells. Empty cell sites are represented by dashed boundaries (none illustrated in FIG. 3).

A close examination of cells 304, 306, 308, 312, 316, and 320 reveals that the cells connectors can reside at different locations relative to the outline of their respective cells (some are connected at the bottom and others near the top, some on the left and others on the right). For example, cell 308 has a clock input at its top right corner, while clock cell 304 has a clock input near the bottom left of the cell.

In the illustrated embodiment, only clock input locations are illustrated and many additional input and output locations are typically present. For example, each cell can have a location reserved for power, and a location reserved for ground. Generally, FIG. 3 represents a clock tree that has inefficiencies such as longer than desirable conductor lines. The longer than necessary conductor lines result in the need for more current from the drive cell 302 than necessary.

FIG. 4 illustrates an intermediate layout 400 in accordance with the present disclosure. Relative to the teachings of 102, 106, 108, 110, 111, and (102-112) of FIG. 1, FIG. 4 illustrates what a graphical user interface could display to a user after the drive cell and the synchronous cells have been relocated to a common or target location. Note cells 422, 428, 434, 440, and 462 represent non-synchronous cells. As discussed above drive cell 402 and the synchronous cells 404, 406, 408, 410, 412, 414, 416 and 420 (cells 404-420) can be automatically moved by the design tool, or "dragged" from existing locations and "dropped" in the target location illustrated by an operator. This movement effectively creates empty cell sites (424, 430, 432, 436, 438, 442, 450, 446, and 460) that are available for use by the CAD tool or designer. Exactly where the cells 404-420 are dropped or placed is not critical but it is generally desirable to place the cells 404-420 in close proximity to the drive cell 402 or near a calculated centroid of the synchronous cells such that the design tool can determine a placement for the synchronous cells proximate to the drive cell, or within a target area.

In the embodiment illustrated at FIG. 4, the synchronous cells have been placed overlying the cells, and thereby violate one or more placement constraints. As a result, a design tool that identifies cells needing legalization and a toll that legalizes cells needing legalization can be used to find available legal locations for the synchronous cells 404-420 in close proximity to the final drive cell 404. The configuration illustrated in FIG. 4 is typically an intermediate or temporary step in the design process. The target area may contain available or empty cell sites or moveable cells that not clocked by drive cell 404 and fixed placement cells that are not clocked by drive cell 404.

Referring to FIG. 5, an improved layout 500 of synchronous clock cells of FIG. 4 in accordance with the system and method disclosed herein is illustrated. The cell configuration illustrated, shows exemplary placement results of a final drive cell 502 and synchronous cells 504, 506, 508, 510, 512, and 516 (cells 504-520) that can be achieved by the system and method disclosed herein. A close examination reveals that moveable cells that are not clocked by clock drive cell 502 have been moved further away from the centroid to make cell sites close to the centroid available for synchronous cells 504-520. It can be appreciated that empty cell sites close to the centroid have also been utilized to move cells 504-520 closer to the centroid. Note cells 522, 524, 526, 530, 532, 534, 536, 538, 540, 542, 546, 548, 550, and 552 are other electronic cells not associated with the final drive cell 502.

As illustrated, the final drive cell can have its output close to the synchronous cells such that the length of the conductor lines connecting the final driver to the synchronous cells can be minimized. This can reduce the capacitive load for each conductor allowing for a smaller clock tree and possibly reducing the number of final drive cells required in the integrated circuit (IC). A closer examination of FIG. 5 reveals that the clock input locations of the synchronous cells are in close proximity to the final drive cell and the length of the conductors in the clock tree have been reduced. Such a configuration can allow more synchronous cells to be connected to a single final driver, possibly eliminating some final drive cells and also reducing the overall size of the clock tree.

It has been determined that when reducing the capacitive loading by reducing the clock tree conductor lengths dynamic power consumption of a clock tree having 60 K gates and 2.5 K synchronous cells can be reduced by more than 13%.

Figure 6:
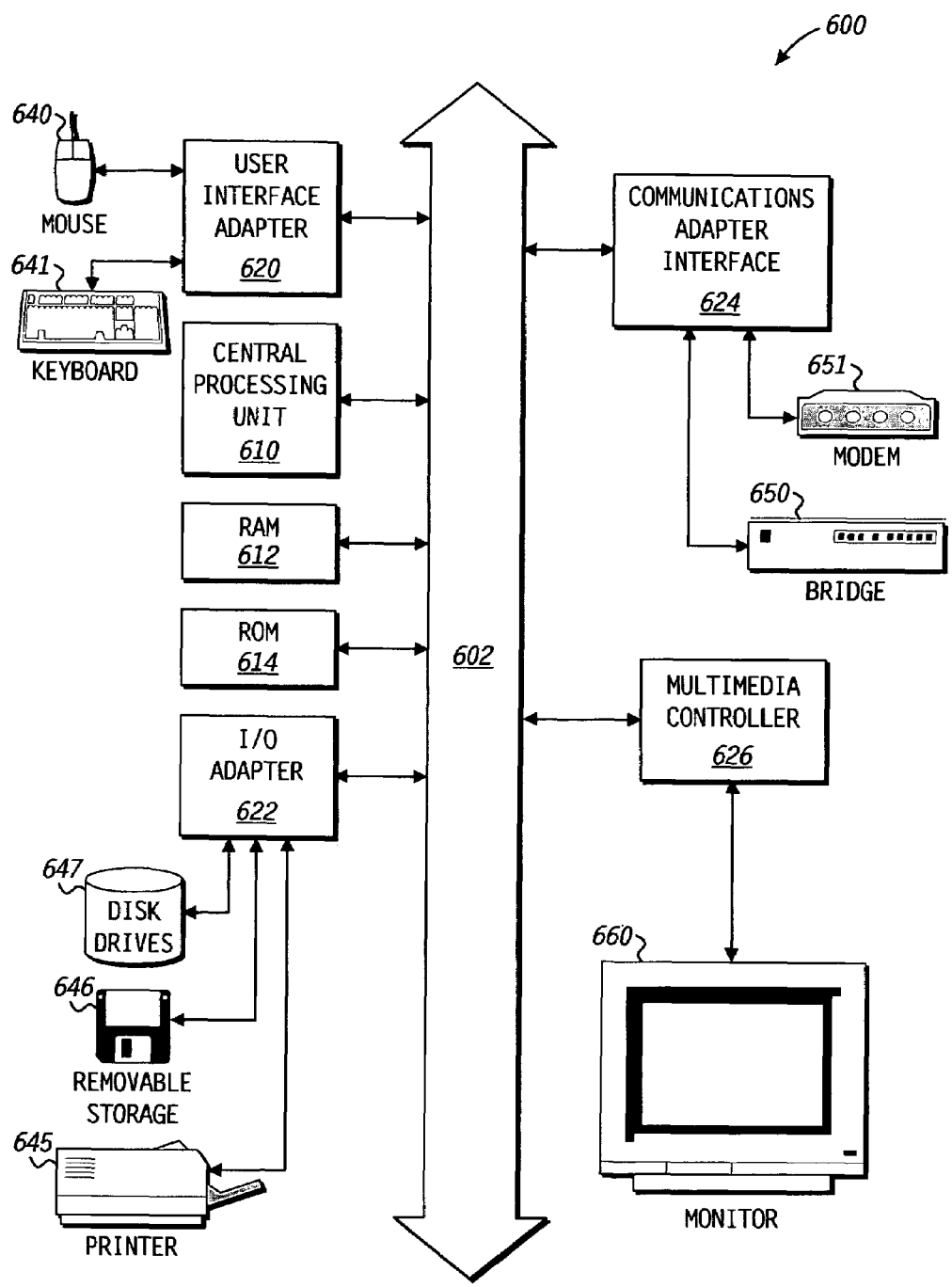
FIG. 6 is a block diagram of a computer system that could be utilized to execute the method disclose herein.

FIG. 6 illustrates, in a block diagram format, a data processing system 600, such as a personal computer workstation, mainframe, and the like, that can operate based upon control information, such as instructions to implant various methods and features described herein. The data processing system 600 is illustrated to include a central processing unit 610, which may be a conventional or proprietary data processor, memory including random access memory (RAM) 612, read only memory (ROM) 614, and input output adapter 622, a user interface adapter 620, a communications adapter interface 624, and a multimedia controller 626.

The input output (I/O) adapter 622 is further connected to, and controls, disk drives 647, printer 645, removable storage devices 646, as well as other standard and proprietary I/O devices. The user interface adapter 620 can be considered to be a specialized I/O adapter. The adapter 620 as illustrated is connected to a mouse 640, and a keyboard 641. In addition, the user interface adapter 620 may be connected to other devices capable of providing various types of user control, such as touch screen devices (not shown).

The communications interface adapter 624 is connected to a bridge 650 such as is associated with a local or a wide area network, and a modem 651. By connecting the system bus 602 to various communication devices, external access to information can be obtained. The multimedia controller 626 will generally include a video graphics controller capable of displaying images upon the monitor 660, as well as providing audio to external components (not illustrated). Generally, the disclosure of the present disclosure can be used within data processing system 600, such as within the central processing unit 610, to provide improved timing of control signal. Additionally, a system such as data processing system 600 could be utilized to execute the method described herein, such as may reside on a processor readable medium, such as a storage tape, disk, or any of the memory or storage devices illustrated in FIG. 6.

Many different aspects and embodiments are possible. Some of those aspects and embodiments are described below. After reading this specification, skilled artisans will appreciate that those aspects and embodiments are only illustrative and do not limit the scope of the present invention.

In a first aspect disclosed herein, a method of designing an integrated circuit includes identifying a plurality of synchronous cells of the integrated circuit to be driven by a clock driver, wherein the plurality of synchronous cells are a subset of previously placed cells of the integrated circuit; and modifying a placement of a synchronous cell of the plurality of synchronous cells to reduce a current needed from the clock driver to drive the plurality of synchronous cells. Another embodiment of the first aspect includes determining whether a timing constraint of the integrated circuit is met subsequent to modifying; changing an orientation of the synchronous cell of the plurality of synchronous cells to reduce the current needed from the clock driver to drive the plurality of synchronous cells. Wherein another embodiment of the first aspect includes modifying the placement of the synchronous cell of the plurality of synchronous cells to a location that is not legal and subsequently legalizing the synchronous cell. Wherein another embodiment of the first aspect includes determining an empty location of the design of the integrated circuit, and placing the synchronous cell of the plurality of synchronous cells at the empty location.

In a second aspect, a method of designing an electronic device includes identifying an output of a component to be coupled to a first plurality of synchronous cells; placing the first plurality of synchronous cells at one or more locations proximate to the output; and legalizing a second plurality of synchronous cells with respect to a design rule, wherein the second plurality of synchronous cells is a subset of the first plurality of synchronous cells. Wherein an embodiment of the second aspect includes placing the second plurality of synchronous cells at locations proximate to the output results in a design rule violation for each synchronous cell of the second plurality of synchronous cells. Wherein another embodiment of the second aspect includes identifying a drive cell comprising the output, and a placing can further include placing the drive cell at a location based on a current location of the drive cell and a current location of a synchronous cell of the first plurality of synchronous cells. Another embodiment of the second aspect can further include determining if a timing constraint of the electronic device subsequent to legalizing the first plurality of synchronous cells is met; and modifying a characteristic of a synchronous cell of the first plurality of synchronous cells when the timing constraint is not met; wherein the timing constraint comprises at least one of a setup time, a hold time, clock skew, and clock latency. Another embodiment of the second aspect further includes integrating a synchronous cell of the first plurality of synchronous cells into unoccupied space proximate to the output. Another embodiment of the second aspect further includes determining a location of a clock input pin on a synchronous cell of the first plurality of synchronous cells subsequent to legalizing and orienting the synchronous cell of the first plurality of synchronous cells to locate the clock input pin closer to the output. Wherein another embodiment of the second aspect includes placing the first plurality of synchronous cells at a centroid of the first plurality of synchronous cells. Another embodiment of the second aspect further includes determining subsequent to legalizing whether there is an orientation of a synchronous cell of the first plurality of synchronous cells that will locate a clock input node of the synchronous cell at a location that can reduce a length of a conductor in a clock tree. Wherein with another embodiment of the second aspect, placing the first plurality of synchronous cells at the one or more location includes the location being associated with a cell of the electronic device having a lower priority than the first plurality of synchronous cells.

A third aspect includes a processor readable medium comprising information to manipulate a data processor, wherein the information comprises control information to identify a plurality of synchronous cells to be driven by a clock driver, wherein the plurality of synchronous cells is a subset of a plurality of electronic cells, wherein the plurality of synchronous cells have been placed within a design of the integrated circuit; and control information to modify placement of a synchronous cell of the plurality of synchronous cells to reduce a current needed from the clock driver to drive the plurality of synchronous cells. Wherein an embodiment of the third aspect includes the processor readable medium being part of a data processing system. Another embodiment of the third aspect includes the third processor readable medium being a hard drive of a data processing system. A specific implementation of the data processing system can include a cell library that defines attributes of the plurality of synchronous cells, and a placement module that utilizes the cell library to determine acceptable placement for the plurality of synchronous cells.

It will be appreciated that the methods described herein can be implemented on system 600 to optimize clock tree configurations of devices as described herein. Benefits, other advantages, and solutions to problems have been described above with regard to specific embodiments. However, the benefits, advantages, solutions to problems, and any element(s) that may cause any benefit, advantage, or solution to occur or become more pronounced are not to be construed as a critical, required, or essential feature or element of any or all the claims. Accordingly, the present disclosure is not intended to be limited to the specific form set forth herein, but on the contrary, it is intended to cover such alternatives, modifications, and equivalents, as can be reasonably included within the spirit and scope of the disclosure. For example, though one embodiment disclosed herein describes first placing a synchronous cell in a location that require the synchronous cell to be legalized, an alternative embodiment could place synchronous cells in empty space that is either created or already available to assure the synchronous cell does not violate a placement constraint.

What is claimed is:
1. A method of designing an electronic device comprising:
   identifying an output of a component to be coupled to a first plurality of synchronous cells;

modifying placement of the first plurality of synchronous cells at one or more locations proximate to the output, wherein modifying placement of the first plurality of synchronous cells includes placing a second plurality of synchronous cells at locations proximate to the output that results in a design rule violation for each synchronous cell of the second plurality of synchronous cells;

legalizing the second plurality of synchronous cells with respect to the design rule, wherein the second plurality of synchronous cells is a subset of the first plurality of synchronous cells and continues to be coupled to the output of the component after legalizing; and determining if a timing constraint of the electronic device subsequent to legalizing the first plurality of synchronous cells is met.

2. The method of claim 1, wherein identifying comprises identifying a drive cell comprising the output.

3. The method of claim 2, further comprising placing the drive cell at a location based on a current location of the drive cell and a current location of a synchronous cell of the first plurality of synchronous cells.

4. The method of claim 1, further comprising:

modifying a characteristic of a synchronous cell of the first plurality of synchronous cells when the timing constraint is not met.

5. The method of claim 4, wherein the timing constraint comprises at least one of a setup time, a hold time, clock skew, and clock latency.

6. The method of claim 1, further comprising integrating a synchronous cell of the first plurality of synchronous cells into unoccupied space proximate to the output.

7. The method of claim 1, further comprising determining a location of a clock input pin on a synchronous cell of the first plurality of synchronous cells subsequent to legalizing and orienting the synchronous cell of the first plurality of synchronous cells to locate the clock input pin closer to the output.

8. The method of claim 1, wherein placing comprises placing the first plurality of synchronous cells at a centroid of the first plurality of synchronous cells.

9. The method of claim 1, further comprising determining subsequent to legalizing whether there is an orientation of a synchronous cell of the first plurality of synchronous cells that will locate a clock input node of the synchronous cell at a location that can reduce a length of a conductor in a clock tree.

10. The method of claim 1, wherein placing the first plurality of synchronous cells at the one or more locations comprises the location being associated with a cell of the electronic device having a lower priority than the first plurality of synchronous cells.

11. A processor readable storage device comprising information to manipulate a data processor, wherein the information comprises:

control information to identify an output of a component to be coupled to a first plurality of synchronous cells;

control information to modify placement of the first plurality of synchronous cells at one or more locations proximate to the output, wherein control information to modify placement of the first plurality of synchronous cells includes control information to place a second plurality of synchronous cells at locations proximate to the output that results in a design rule violation for each synchronous cell of the second plurality of synchronous cells;

control information to legalize the second plurality of synchronous cells with respect to the design rule, wherein the second plurality of synchronous cells is a subset of the first plurality of synchronous cells and continues to be coupled to the output of the component after legalizing; and control information to determine if a timing constraint of the electronic device subsequent to legalizing the first plurality of synchronous cells is met.

12. The processor readable storage device of claim 11, further comprising:

control information to modify a characteristic of a synchronous cell of the first plurality of synchronous cells when the timing constraint is not met.

13. The processor readable storage device of claim 11, further comprising control information to determine subsequent to the control information legalizing the second plurality of synchronous cells whether there is an orientation of a synchronous cell of the first plurality of synchronous cells that will locate a clock input node of the synchronous cell at a location that can reduce a length of a conductor in a clock tree.

* * * * *